3,318,919
PROCESS FOR THE PARTIAL HYDROGENATION OF 24(28)-DEHYDROERGOSTEROL TO ERGOSTEROL

Manfred Kühne, Unna-Konigsborn, and Emanuel Kaspar, Kamen, Westphalia, Germany, assignors to Schering A.G.
No Drawing. Filed Oct. 19, 1965, Ser. No. 498,097
Claims priority, application Germany, Dec. 10, 1964, Sch 36,228
7 Claims. (Cl. 260—397.2)

This invention relates to a process for the partial hydrogenation of 24(28)-dehydroergosterol to ergosterol.

Ergosterol has been the subject of considerable interest. Its decomposition has recently gained increasing importance for the manufacture of suitable intermediates for the partial synthesis of steroid hormones. When it is considered that the fermentative preparation of ergosterol from yeast produces not only the desired ergosterol but also, and often predominantly, the 24(28)-dehydroergosterol which is not suitable for the decomposition reaction, it will be readily appreciated that the ultimately desired starting material for the partial synthesis of steroid hormones can be obtained only at very low overall yield. Because of the foregoing, it is therefore desirable to develop methods which permit the otherwise useless 24(28)-dehydroergosterol to be made available for ergosterol decomposition, for example by selective hydrogenation of the 24(28)-double bond.

It is an object therefore, of the present invention, to partially hydrogenate 24(28)-dehydroergosterol to obtain useful hormone products.

When 24(28)-dehydroergosterol is hydrogenated by means of hydrogen in the presence of Raney nickel, $\Delta^7$-ergostene-3-beta-ol is formed by attack of the diene system of the side chain as well as the ring B.Cf., Breivik, J. Org. Chem. 19 (1954), 1734. It is also known to those skilled in the art of experimental steroid chemistry that the $\Delta^5$ double bond is capable of being hydrogenated under the mildest conditions, even in the presence of Pd, if there is simultaneously a conjugated $\Delta^7$ bond, cf., Patent No. 2,813,879. It furthermore has been found that the diene system present in the side chain of the 24(28)-dehydroergosterol substantially increases the known sensitivity of the $\Delta^5$ double bond in the $\Delta^{5,7}$ diene system.

It was, therefore, surprising that the selective hydrogenation of the $\Delta^{24(28)}$ double bond in 24(28)-dehydroergosterol could be achieved by means of alkylaluminum derivatives of the general formula: $Al(R_1, R_2, R_3)$; wherein at least two of $R_1$, $R_2$, and $R_3$ are alkyl, and one may also be hydrogen.

The primary reaction product formed is hydrolyzed in a known manner; and the ergosterol or ergosterol ether so produced is isolated in the usual way.

Suitable inert solvent media for the hydrogenation process of the invention are those which are themselves stable in the presence of reducing agents and which are themselves stable in the presence of alkyl aluminum derivatives which are employed as reducing or hydrogenation agents. Typical examples of preferred solvents are xylene, toluene and cyclohexene.

The selective hydrogenation should be carried out with the exclusion of atmospheric oxygen, and preferably under a protective gas atmosphere, such as argon or nitrogen.

Pure 24(28)-dehydroergosterol, its esters and ethers, or crude mixtures of 24(28)-dehydroergosterol, its esters and ethers and ergosterol as they are produced from yeast, are equally suitable starting materials for the method of the invention.

The following examples are given by way of illustration to show the novel procedure of hydrogenating 24(28)-dehydroergosterol.

Example 1

A solution of 555 mg. of 24(28)-dehydroergosterol in 200 ml. of xylene was mixed with 2.7 g. of diisobutylaluminum hydride at room temperature under an argon atmosphere. The reaction mixture was heated to 100° C. for three hours, cooled to ambient temperature, and washed with aqueous sodium hydroxide, and then with water. The xylene phase was separated from the aqueous material, dried and evaporated to dryness in a vacuum. The residue which weighed 520 mg. was recrystallized from ethanol. The ergosterol thus obtained had a melting point of 156–159° C., was identical wtih a sample of ergosterol in its IR, NMR and UV spectra.

Example 2

0.5 gram of a mixture containing about 0.275 g. of 24(28)-dehydroergosterol and about 0.225 g. of ergosterol was dissolved in 5 ml. of absolute xylene or toluene with the exclusion of moisture and in the presence of a nitrogen atmosphere, and was mixed at room temperature with a solution of 0.6 g. of diisobutylaluminum hydride in 20 ml. absolute xylene or toluene. The mixture was heated to 100° C. for three hours and was worked up after cooling as described in Example 1. The ergosterol obtained was recrystallized from ethanol. The purified product melted at 157–160° C. and was identified by comparison with a known sample of ergosterol by its IR, UV, and NMR spectra.

Example 3

A solution of 0.2 g. of a mixture, which contained about 0.1 g. of 24(28)-dehydroergosterol and 0.1 g. of ergosterol in 10 ml. absolute xylene or toluene was mixed with 0.49 ml. triisobutylaluminum at room temperature under a nitrogen atmosphere. The mixture was heated to 100° C. for three hours, cooled to ambient temperature, and washed with aqueous sodium hydroxide, and then with water. The xylene phase was separated from the aqueous material, dried and exaporated to dryness in a vacuum. The residue which weighed 1.9 g. was recrystallized from ethanol. The ergosterol thus obtained had a melting point of 157–159.5° C., and was identical with a known sample of ergosterol in its IR, NMR and UV spectra.

Example 4

A mixture which was identical with that in Example 2 was heated 24 hours at 70° C. under a nitrogen atmosphere in absence of moisture. After cooling it was worked up as described in Example 1. The product was identical with a known sample of ergosterol. Its melting point was 157–159° C.

Example 5

A solution of 0.5 g. of a mixture, which contained about 0.25 g. of ergosterol acetate and 0.25 g. of 24(28)-dehydroergosterol acetate was mixed with a solution of 1.2 g. of diisobutylaluminum hydride in 20 ml. of absolute xylene or toluene at room temperature under a nitrogen atmosphere and with exclusion of moisture. The mixture was heated 6 hours to 100° C. and worked up after cooling to room temperature as described in Example 1. The ergosterol obtained was recrystallized from ethanol. The purified product melted at 156–158° C. and was identical with a known sample of ergosterol.

What is claimed is:
1. A method of preparing ergosterol which comprises:
   (a) reacting a substance selected from the group consisting of 24(28)-dehydroergosterol and the esters and ethers of said dehydroergosterol with an alkylaluminum compound of the formula:

wherein at least two of said $R_1$, $R_2$, $R_3$ are isobutyl and not more than one of said $R_1$, $R_2$, $R_3$ is hydrogen, in the presence of an inert organic solvent;
(b) hydrolyzing the primary reaction product formed; and
(c) recovering a compound selected from the group consisting of ergosterol and an ether of said ergosterol from the product of hydrolysis.

2. A method as set forth in claim 1, wherein 24(28)-dehydroergosterol is reacted with said alkylaluminum compound.

3. A method as set forth in claim 1, wherein said alkylaluminum compound is diisobutylaluminum hydride.

4. A method as set forth in claim 1, wherein said alkylaluminum compound is triisobutylaluminum.

5. A method as set forth in claim 1, wherein said substance is reacted with said alkylaluminum compound in the absence of atmospheric oxygen.

6. A method as set forth in claim 5, wherein said substance is reacted with said alkylauminum compound in a protective gaseous atmosphere.

7. A method as set forth in claim 6, wherein said atmosphere consists essentially of argon or nitrogen.

References Cited by the Examiner

UNITED STATES PATENTS 3,143,542   8/1964   Ziegler et al. _____ 260—239

LEWIS GOTTS, *Primary Examiner.*

ELBERT L. ROBERTS, *Examiner.*

THOMAS M. MESHBESHER, *Assistant Examiner.*